(12) United States Patent
Bhaowal et al.

(10) Patent No.: US 10,430,513 B2
(45) Date of Patent: Oct. 1, 2019

(54) AUTOMATED PERSONALIZED ELECTRONIC MESSAGE COMPOSITION

(71) Applicant: OATH INC., New York, NY (US)

(72) Inventors: Mayukh Bhaowal, Redwood City, CA (US); Kevin Patel, Sunnyvale, CA (US); Lei Bao, San Francisco, CA (US)

(73) Assignee: OATH INC., New York, NY (US)

( * ) Notice: Subject to any disclaimer, the term of this patent is extended or adjusted under 35 U.S.C. 154(b) by 672 days.

(21) Appl. No.: 14/926,382

(22) Filed: Oct. 29, 2015

(65) Prior Publication Data

US 2017/0124062 A1     May 4, 2017

(51) Int. Cl.
*G06F 17/27* (2006.01)

(52) U.S. Cl.
CPC .......... *G06F 17/271* (2013.01); *G06F 17/274* (2013.01)

(58) Field of Classification Search
CPC .................................................... G06F 3/0237
USPC .......................................................... 715/271
See application file for complete search history.

(56) References Cited

U.S. PATENT DOCUMENTS

2013/0211821 A1*  8/2013  Tseng .................... G06F 17/273
                                                                704/9

\* cited by examiner

*Primary Examiner* — Shawn S Joseph
(74) *Attorney, Agent, or Firm* — James J. DeCarlo; Greenberg Traurig, LLP (57) ABSTRACT

Disclosed herein is an automated personalized message composition system, method and architecture. A composition style of a user is learned for each of a number of categories, such that each category has a corresponding composition style. The user's composition style determined for a given category can be used to personalize a non-personalized message for the user. A personalized message including elements of the user's composition style. The composition style elements from the user's composition style replacing a number of non-personalized elements in the non-personalized message.

27 Claims, 7 Drawing Sheets

```
                                                    102
┌─────────────────────────────────────────────┐  ┘
│  ASSIGN EACH MESSAGE OF A PLURALITY OF      │
│       A USER'S MESSAGES TO A CATEGORY       │
└─────────────────────────────────────────────┘
                       │
                       ▼                           104
┌─────────────────────────────────────────────┐  ┘
│    DETERMINE THE USER'S COMPOSITION         │
│    STYLE FOR A CATEGORY USING THE           │
│    MESSAGES ASSIGNED TO THE CATEGORY        │
└─────────────────────────────────────────────┘
                       │
                       ▼                           106
┌─────────────────────────────────────────────┐  ┘
│    PROVIDE A NUMBER OF PERSONALIZED         │
│    MESSAGES IN A GIVEN CATEGORY USING       │
│       THE USER'S COMPOSITION STYLE          │
│       DETERMINED FOR THE CATEGORY           │
└─────────────────────────────────────────────┘
```

AUTOMATED PERSONALIZED ELECTRONIC MESSAGE COMPOSITION

FIELD OF THE DISCLOSURE

The present disclosure relates to electronic message composition, and more particularly to automating message composition personalized for messaging users.

BACKGROUND

Electronic messaging has become a typical manner of communication among computer users in a number of different environments, e.g., work, social, etc. Computer users can use various types of electronic messages, such as electronic mail, or email, instant messages, short messages, etc. Electronic messaging capability is available on almost any type of computing device, such as and without limitation a desktop computer, laptop computer, tablet, smartphone, mobile telephone, etc.

SUMMARY

It would be beneficial to improve electronic messaging technology since its use is widespread and of ever increasing volume as a communication medium. Embodiments of the present disclosure improve the technology via, at least, speeding the message generation process by assisting in the generation of an electronic message among other features and functions disclosed herein.

In accordance with one or more embodiments, an electronic message generation capability is personalized and can be used to compose an electronic message for a user. By way of a non-limiting example, machine learning can be used to learn a user's composition style, such that a message composed for a user can be personalized for the user using the user's unique composition style. This not only results in the ability to create messages faster but to have them appear in a form or style associated with the message sender. In accordance with one or more embodiments, personalized message composition can take into account an occasion.

In accordance with one or more embodiments, a method is provided, the method comprising assigning, by a computing device, each message of a plurality of a user's messages to a corresponding category of a plurality of categories, the assigning comprising using each message's features and a message classifier to assign the message to the message's corresponding category; determining, by the computing device, a plurality of composition styles for the user, the determining comprising determining the user's composition style for each category of the plurality using a number of messages of the plurality assigned to the category; and providing, by the computing device and for the user, a number of personalized messages in a category of the plurality, each personalized message being generated by modifying a non-personalized message using the user's determined composition style for the category.

In accordance with one or more embodiments a system is provided, which system comprises at least one computing device, each computing device comprising a processor and a storage medium for tangibly storing thereon program logic for execution by the processor, the stored program logic comprising assigning logic executed by the processor for assigning each message of a plurality of a user's messages to a corresponding category of a plurality of categories, the assigning comprising using each message's features and a message classifier to assign the message to the message's corresponding category; determining logic executed by the processor for determining a plurality of composition styles for the user, the determining comprising determining the user's composition style for each category of the plurality using a number of messages of the plurality assigned to the category; and providing logic executed by the processor for providing, for the user, a number of personalized messages in a category of the plurality, each personalized message being generated by modifying a non-personalized message using the user's determined composition style for the category.

In accordance with yet another aspect of the disclosure, a computer readable non-transitory storage medium is provided, the medium for tangibly storing thereon computer readable instructions that when executed cause at least one processor to assign each message of a plurality of a user's messages to a corresponding category of a plurality of categories, the assigning comprising using each message's features and a message classifier to assign the message to the message's corresponding category; determine a plurality of composition styles for the user, the determining comprising determining the user's composition style for each category of the plurality using a number of messages of the plurality assigned to the category; and provide, for the user, a number of personalized messages in a category of the plurality, each personalized message being generated by modifying a non-personalized message using the user's determined composition style for the category.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes an automated personalized message composition system, method and architecture. In accordance with one or more embodiments, a user's composition style is learned for each of a number of categories, or types. For a given category and a non-personalized message in the category, the user's composition style learned for the category can be used to personalize the non-personalized message, so that the resulting message includes personalized composition elements used in place of non-personalized elements of the non-personalized message.

In accordance with one or more embodiments, a number of personalized messages in one or more categories may be presented for selection by the user. The user may select from the personalized messages and may be given an ability to modify the selected personalized message.

By way of a non-limiting example, each category can correspond to a distinct or different composition style relative to the composition styles of other categories. For example, composition style used in a "thank you" category of messages is very likely to be different from the composition style used in bereavement messages. By way of some non-limiting examples, categories might include categories for different types of occasions, intended uses, etc. Examples of categories include without limitation, birthdays, holidays, anniversaries, or other occasions, job application, meeting invite, party invite, thank you or other expressions of gratitude or other types of sentiments, feelings, or emotions, etc. It should be apparent that embodiments of the present disclosure may be used to personalize any category of message for a user using a composition style determined for the user and the category in accordance with one or more embodiments of the present disclosure.

In accordance with one or more embodiments, a composition style of a user is learned for each of a number of categories, such that each category has a corresponding composition style. The user's composition style determined for a given category can be used to personalize a non-personalized message for the user. A personalized message includes a number of elements of the user's composition style. In generating the personalized message for the user, the user's composition style is used to replace non-personalized elements used in the non-personalized message with personalization elements in accordance with the user's composition style.

By way of some non-limiting examples, a category's composition style can include personalization elements including vocabulary elements, such as and without limitation words, groups of words, phrases, etc., interrelationships between vocabulary elements, as well as other elements such as and without limitation greetings, salutations, closings, signatures, etc. determined to be used by the user in the user's messages identified for a given category.

Figure 1:
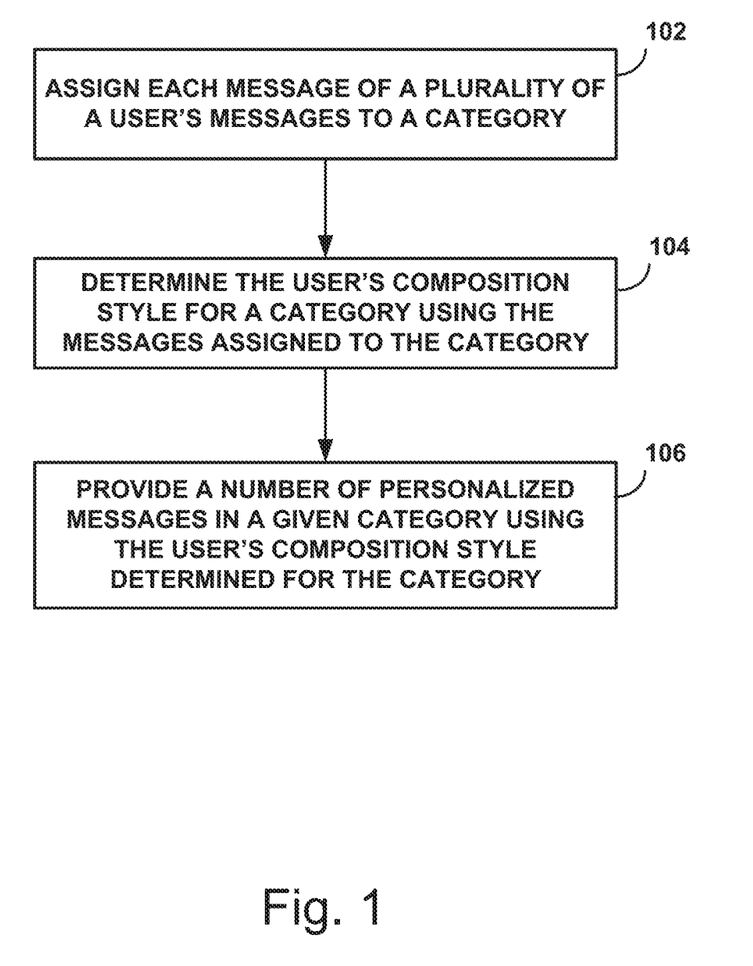
FIG. 1 provides an illustration of a process overview for use in accordance with one or more embodiments of the present disclosure.

FIG. 1 provides an illustration of a process overview for use in accordance with one or more embodiments of the present disclosure. At step 102, a plurality of a user's messages are assigned to each category of a plurality of categories. The categories may be predefined categories, categories defined using the user's messages or some combination. In accordance with one or more embodiments, each of the user's messages is classified as belonging to a category using a message classifier and a set of features determined for the message.

By way of some non-limiting examples, message features can include presence or absence of a signature, signature content, e.g., the user's use of the full name, first name, last name or initial at the end of the message, average word length, maximum word length, type of greeting, or salutation, used, such as "Hi", "Hello", "Hey", "Dear", "Yo", absence of a greeting, etc., length of the user's sentences, font, such as font type, font size, variations used in message, highlighting, bolding and other types of font styles, recipient list, e.g., list of recipients in the "To", "cc", "bcc", etc. fields, message date, e.g., sent date, occasion and/or holidays in the vicinity of the message date, and the like.

In accordance with one or more embodiments, a message classifier is trained using a message corpus comprising a plurality of messages, e.g., a number of messages in each of the plurality of categories. A set of features is identified for each message of the corpus, and the set of features of each message of the corpus is input to a model generator that generates the message classifier. The message classifier generated by the model generator can output a probability for each of the categories given a message's set of features, where a category's probability indicates the likelihood that the message belongs to the category. The set of probabilities can be used to assign a message to a category. By way of a non-limiting example, the message can be assigned to the category with the highest probability relative to the other categories' probabilities.

In accordance with one or more embodiments, a message classifier may comprise a naïve Bayes, support vector machine (SVM), deep learning, logistic regression etc. classifier, or model. It should be apparent that other suitable types of statistical modeling may be used with embodiments of the present disclosure. In addition, the machine learning used in generating the message classifier can be supervised, unsupervised, or some combination of both. In supervised learning, a label may be provided for a message in the training data set indicating the category to which the message belongs. In unsupervised learning, unlabeled messages may be used and the training process can identify a category, or categories, using the unlabeled messages.

At step 104, the user's composition style is determined for each category. By way of a non-limiting example, for a given category, the user's composition style for the category is determined using the messages assigned to the category by the message classifier. In accordance with one or more embodiments, a composition style can have a number of attributes, such as and without limitation an average message length, gender, age, education level, vocabulary, formal/casual voice, sentence fluency, etc.

In accordance with one or more embodiments, a category's composition style comprises a vocabulary, which comprises a number of vocabulary elements. By way of some non-limiting examples, vocabulary elements can comprise words, word groupings and phrases used by the user in the user's messages assigned to the category. In accordance with at least one embodiment, a category's vocabulary can comprise element relationships, or associations. By way of a non-limiting example, word2vec, or other tool, may be used to identify relationships, e.g., semantic relationships, between words in a vocabulary.

In accordance with one or more embodiments, a category's vocabulary comprises a set of words, excluding stop words, which occur most frequently in the user's messages assigned to the category using the message classifier. In other words, for a given category, after eliminating stop words, from the messages classified as belonging to the category, a count of the number of occurrences of each remaining word in the messages can be obtained, and a number of words with the highest frequency of occurrence, relative to other words used in the message, can be selected for inclusion in the category's vocabulary. A similar process may also be used to word groupings, phrases, greetings, signatures, etc.

In accordance with one or more embodiments, a vocabulary element can be associated with its syntactic function, e.g., a tag indicating a part of speech, such as an adjective, verb, noun, and adverb, etc., for the vocabulary element.

At step 106, number of personalized messages in a given category are provided to the user. Each of the personalized messages is generated by modifying a non-personalized message using the user's determined composition style for the category. By way of some non-limiting examples, the greeting used in the non-personalized message may be replaced by a greeting from the user's determined composition style, the signature used in the non-personalized message may be replaced by a signature from the user's determined composition style, and words, phrases, etc. in the body of the non-personalized message may be replaced by words, phrases, etc. from the user's determined composition style.

By way of a further non-limiting example, assume that the category comprises a thank you messages, the non-personalized message includes the phrase "Thank you for your kindness", and a user's composition style includes the phrases "Thank you for your support" and "Many thanks for your help". In accordance with one or more embodiments, either phrase from the user's composition style can be used as a replacement for the non-personalized phrase.

By way of another non-limiting example, assume that the category comprises a romance messages, the non-personalized message includes the phrase "I love you more every day", and a user's composition style includes the phrases "I miss you more everyday", "I can't wait to see you more everyday", and "I like you more everyday". In accordance with one or more embodiments, any of the three phrases from the user's composition style can be used as a replacement for the non-personalized phrase.

Figure 2:
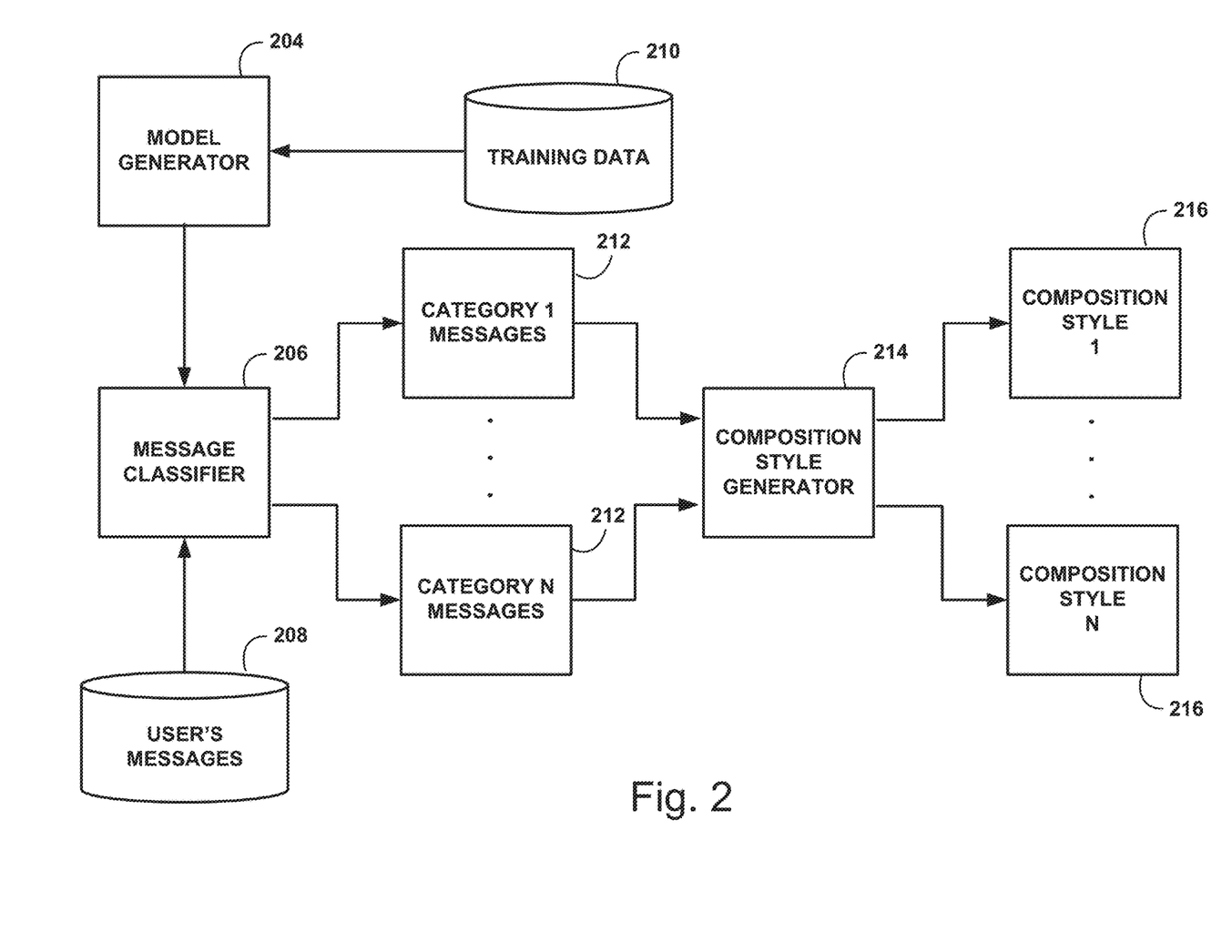
FIG. 2 provides an example of a component overview in accordance with one or more embodiments of the present disclosure.

FIG. 2 provides an example of a component overview in accordance with one or more embodiments of the present disclosure. In the example shown in FIG. 2, training data 210 is input to model generator 204, which uses the training data 210 to generate message classifier 206. Training data 210 comprises a message corpus comprising a number of messages, each message having a set of features input to the model generator 204. Training data 210 may include labeled messages, unlabeled messages or a combination thereof. Labeled messages include label data indicating the message's category. Unlabeled messages typically do not include data indicating the message's category. The model generator 204 is configured to identify an unlabeled message's category. The category may be a category identified by label data from labeled messages or a category defined by model generator 204.

In accordance with one or more embodiments, message classifier 206 may be tested using a test data set (not shown), which comprises a set of test messages, each message in the test data set has a known category. The classification output provided by the message classifier 206 in response to the test data set as input can be compared with the actual category information known about the messages in the test data set to determine the accuracy of the message classifier 206. Model generator 204 can be used to regenerate message classifier 206 until a desired level of accuracy is achieved, e.g., an optimized solution is reached.

Message classifier 206 is configured to receive a user's messages 208 as input and to assign each message in the user's messages 208 to a category 212, e.g., categories 1-N in the example shown in FIG. 2. Each of the user's messages 208 has an associated set of features as input to the message classifier. Message classifier 206 assigns each message of the user's messages 208 to category 212 using each message's set of features.

Composition style generator 214 determines the user's composition style 216 for each category 212 of messages. To determine composition style 1 corresponding to category 1, for example and without limitation, composition style generator 214 uses each of the user's messages 208 assigned to category 1 by message classifier. Each composition style 216 associated with a category 212 comprises a vocabulary of elements, e.g., words, phrases, word groups, etc., syntactic tags associated with each element, etc.

Figure 3:
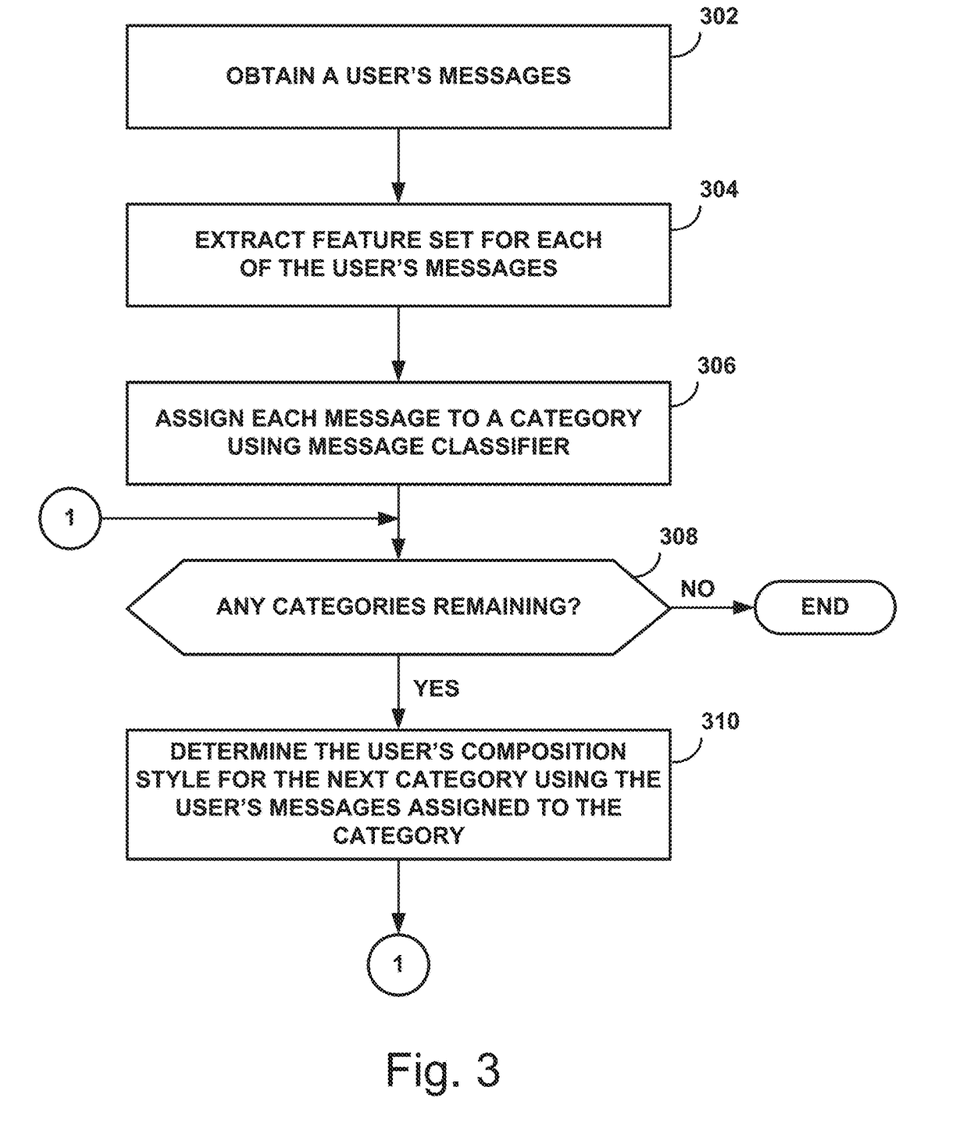
FIG. 3 provides an example process flow in accordance with one or more embodiments of the present disclosure.

FIG. 3 provides an example process flow in accordance with one or more embodiments of the present disclosure. At step 302, a number of a user's messages are obtained. By way of a non-limiting example, the user's messages may be retrieved from a message data store which might be resident at the user's client computing device(s) and/or one or more server computing devices. At step 304, features are extracted from each of the user's messages obtained at step 302. At step 306, each message is assigned to a category using message classifier 206 and the message's feature set determined at step 304.

At step 308, a determination is made whether any categories remain to be processed. If not processing ends. If a determination is made, at step 308, that at least one category remains to be processed, processing continues at step 310. At step 310, the user's composition style is determined for the next category using the user's messages assigned to the category at step 306. By way of a non-limiting example, step 310 may be performed by composition style generator 214. Processing continues at step 308 to process any remaining categories.

Figure 4:
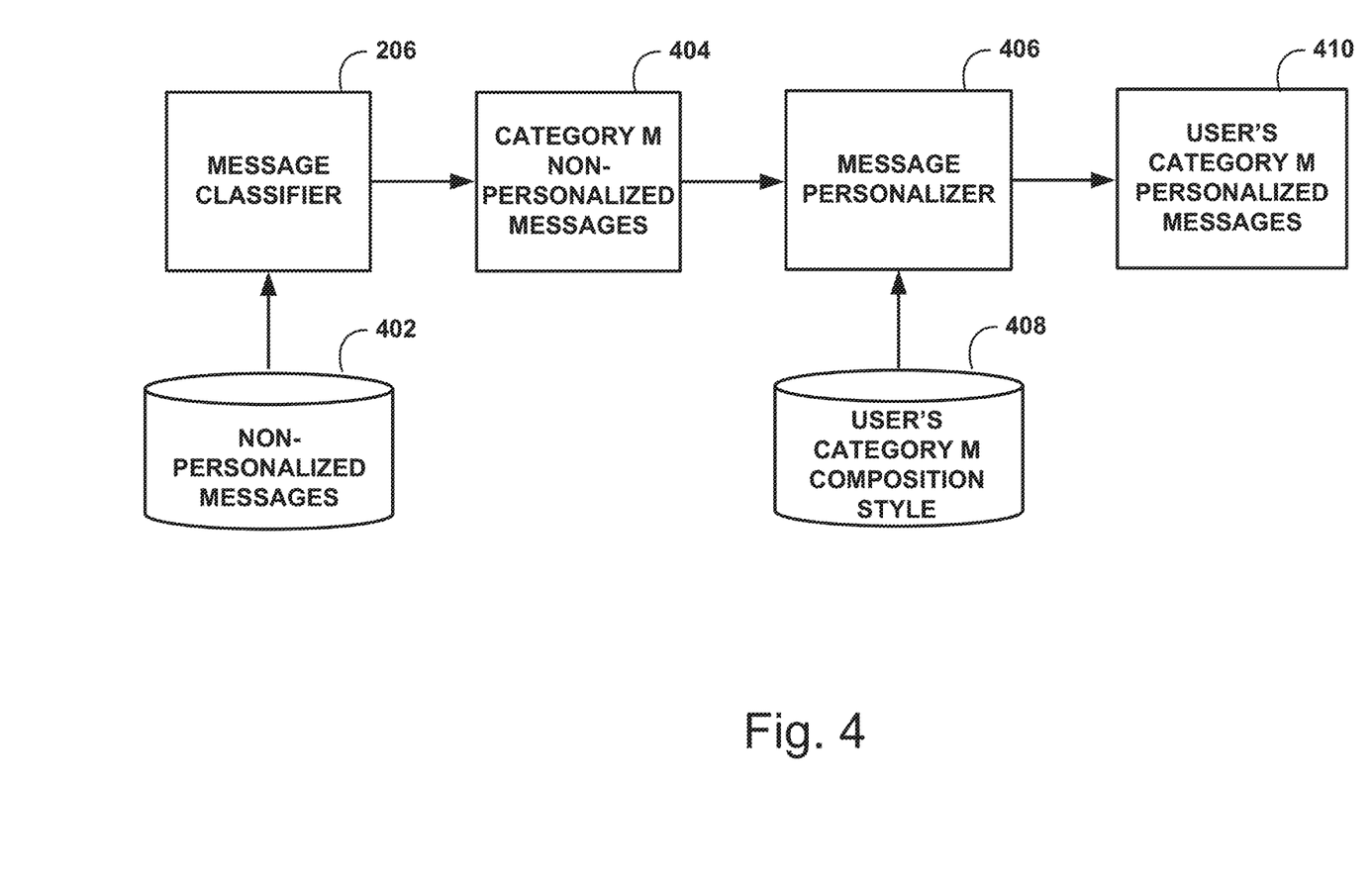
FIG. 4 provides a component overview example in accordance with one or more embodiments of the present disclosure.

FIG. 4 provides a component overview example in accordance with one or more embodiments of the present disclosure. In the example shown in FIG. 4, non-personalized messages assigned to a category, e.g. category M, are personalized using the user's category M composition style to generate the user's personalized messages for the category. It should be apparent that while the example shows a single category, e.g., category M, a similar process may be performed for each of the categories, e.g., categories 1-N.

In the example shown in FIG. 4, message classifier 206 receives non-personalized messages 402. By way of a non-limiting example, a set of features for each non-personalized message is input to message classifier 206, and each non-personalized message is assigned to a category by the message classifier 206. The category M non-personalized messages 404 are input to message personalizer 406. Message personalizer 406 uses the user's category M composition style 206 to generate the user's category M personalized messages 408.

Figure 5:
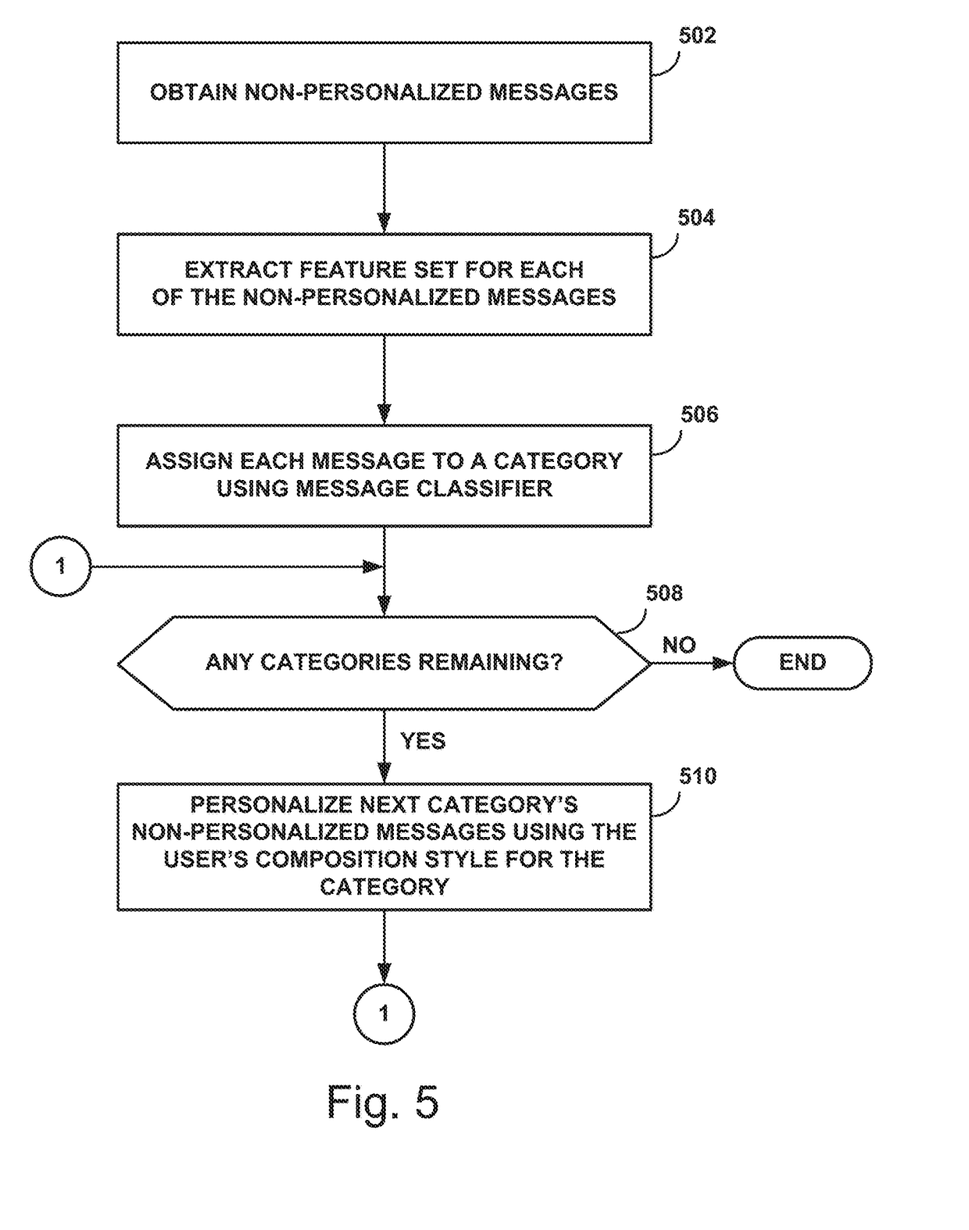
FIG. 5 provides a process flow example in accordance with one or more embodiments of the present disclosure.

FIG. 5 provides a process flow example in accordance with one or more embodiments of the present disclosure. At step 502, non-personalized messages are obtained. By way of a non-limiting example, the non-personalized messages may be retrieved from users' message data stores resident at the users' computing devices, a number of server computers, or some combination of both.

At step 504, a set of features is extracted from each of the non-personalized messages obtained at step 502. At step 506, each non-personalized message is assigned to a category using message classifier 206 and the message's feature set determined at step 504. At step 508, a determination is made whether any categories remain to be processed. If not, processing ends. If a determination is made, at step 508, that at least one category remains to be processed, processing continues at step 510. At step 510, the next category's non-personalized messages are personalized using the user's composition style for the category.

Figure 6:
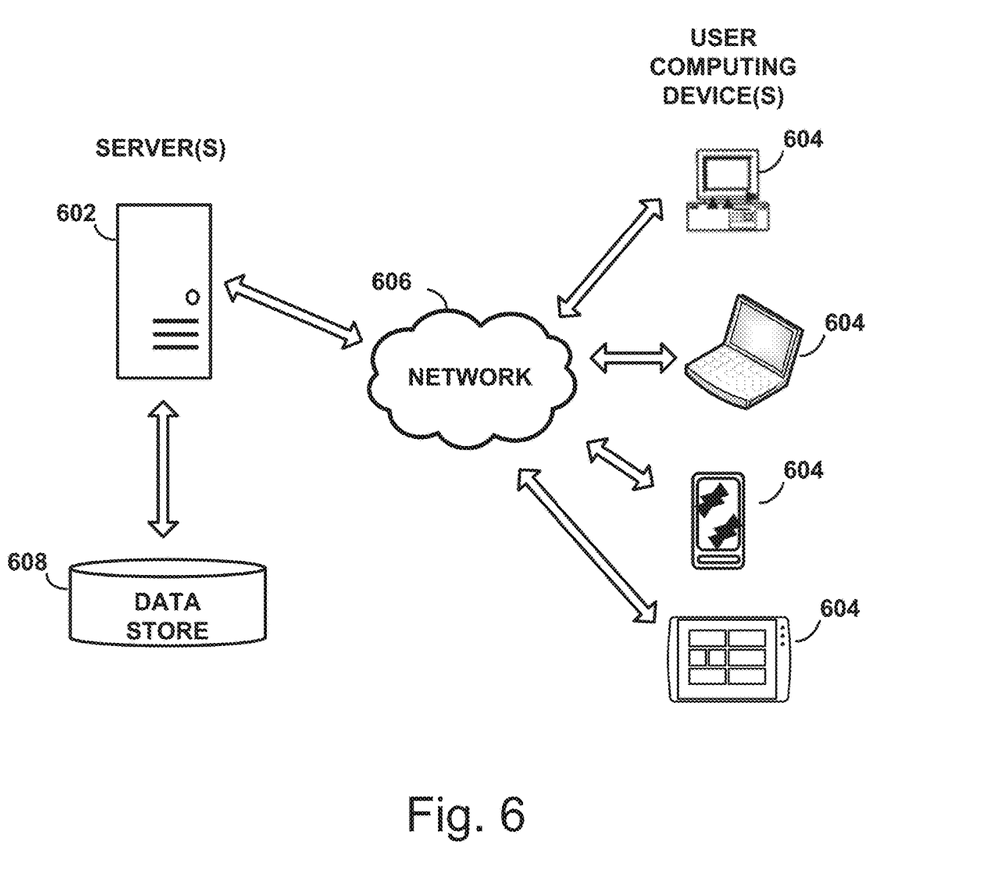
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 602 can be configured to execute program code, instructions, etc. to provide functionality in accordance with one or more embodiments of the present disclosure. The same or another computing device 602 may be configured to execute program code to implement functionality in accordance with one or more embodiments of the present disclosure.

Computing device 602 can serve content to user computing devices 604 using a browser application via a network 606. Data store 608 can be used to store program code to configure a server 602 to functionality in accordance with one or more embodiments of the present disclosure.

The user computing device 604 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 6. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 7:
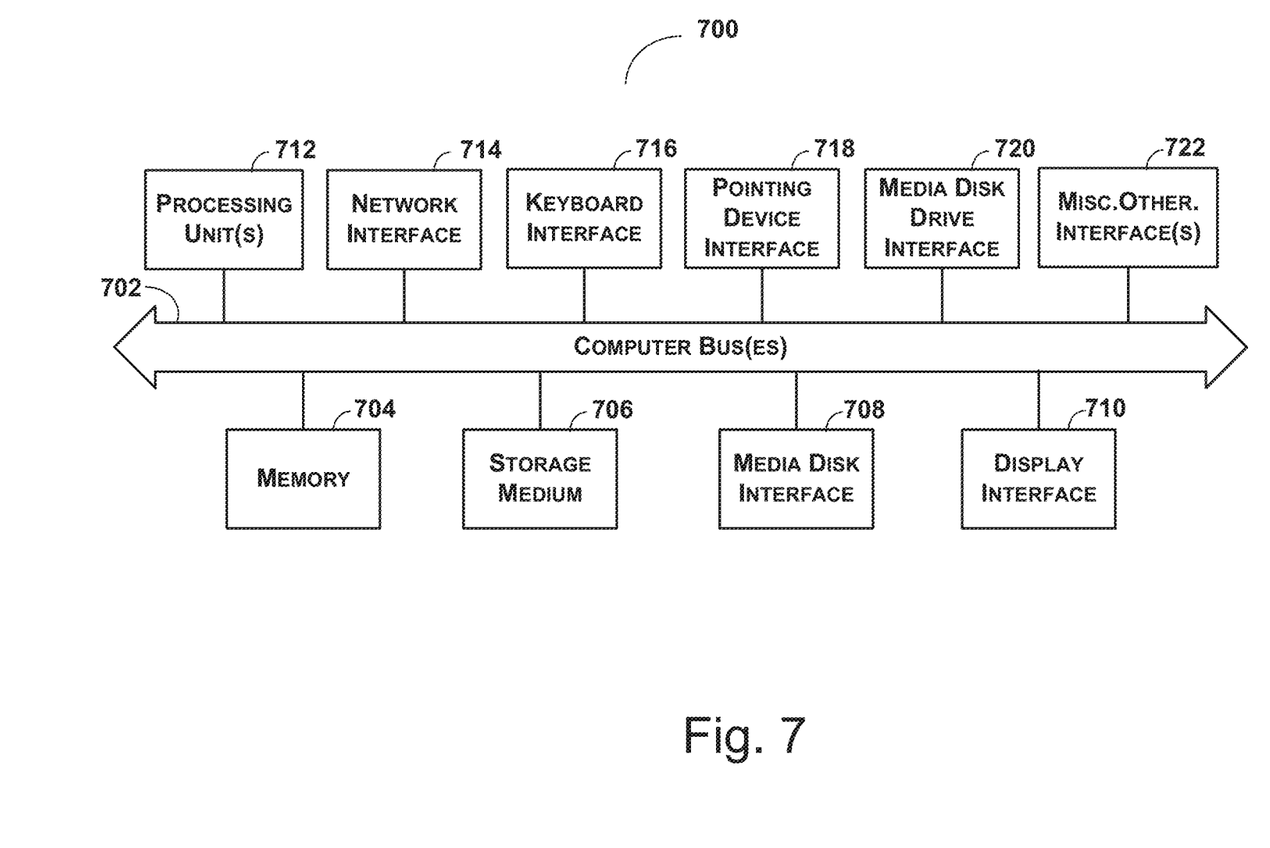
FIG. 7 is a detailed block diagram illustrating an internal architecture of a computing device in accordance with one or more embodiments of the present disclosure.

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
  training, by an electronic messaging computing device, a message classifier using a corpus of messages and machine learning;
  retrieving, by the electronic messaging computing device and from a data store of a user, a plurality of messages of the user;
  assigning, by the electronic messaging computing device and using the message classifier, each message of a plurality of messages of the user to a category of a plurality of categories of electronic messages, the assigning comprising using the each message's features and the message classifier to assign the each message to one category of the plurality of categories;
  determining, by the electronic messaging computing device and for a category of the plurality of categories, a composition style for the user, the determining comprising determining the user's composition style for the category using a number of messages, of the plurality of messages of the user, assigned to the category;
  obtaining, by the electronic messaging computing device and for the category of the plurality of categories, multiple non-personalized messages of multiple users;
  generating, by the electronic messaging computing device and for the user of an electronic messaging system, a number of personalized messages for the category of the plurality of categories, each personalized message being generated by modifying a non-personalized message, of the multiple non-personalized messages of the multiple users, using the user's determined composition style for the category; and
  providing, by the electronic messaging computing device and for the user of the electronic messaging system, the number of personalized messages generated using the user's composition style determined for the category of the plurality of categories, each personalized message, of the number, being selectable by the user for modification by the user.

2. The method of claim 1, training the message classifier using machine learning further comprising:
  collecting, by the electronic messaging computing device, the corpus of messages comprising a number of messages in the each category of the plurality of categories;
  identifying, by the electronic messaging computing device, the features for the each message of the corpus; and
  generating, by the electronic messaging computing device, the message classifier using the identified features of the each message of the corpus.

3. The method of claim 1, the assigning further comprising:
  identifying, by the electronic messaging computing device, the features for the each message of the user's plurality of messages; and
  for the each message of the user's plurality of messages, the electronic messaging computing device using the each message's features as input to the message classifier, the message classifier being used to provide a plurality of probabilities corresponding to the plurality of categories, each probability of the plurality corresponding to a category of the plurality and identifying a likelihood that the each message belongs to the category.

4. The method of claim 1, the determining a plurality of composition styles of the user further comprising:
  for the one category of the plurality of categories:
    identifying, by the electronic messaging computing device, a vocabulary of the user using the one category's assigned messages; and
    identifying, by the electronic messaging computing device, a syntactic function of each vocabulary element in the user's identified vocabulary.

5. The method of claim 1, each category's corresponding vocabulary comprising a plurality of elements and a number of element relationships, each element comprising one or more words.

6. The method of claim 5, the plurality of elements comprising a number of phrases.

7. The method of claim 1, the providing further comprising:
  for each non-personalized message:

replacing a number of non-personalized elements of the non-personalized message with personalized elements from the user's composition style for the category.

8. The method of claim 7, the replacing further comprising replacing a non-personalized greeting with a personalized greeting and a non-personalized signature with a personalized signature in accordance with the user's composition style for the category.

9. The method of claim 7, the replacing further comprising replacing a number of words used in the non-personalized message with words from the user's vocabulary identified for the category.

10. An electronic messaging system computing device comprising:
a processor and a storage medium for tangibly storing thereon program logic for execution by the processor, the stored program logic comprising:
training logic executed by the processor for training a message classifier using a corpus of messages and machine learning;
retrieving logic executed by the processor for retrieving, from a data store of a user, a plurality of messages of the user;
assigning logic executed by the processor for assigning, using the message classifier, each message of a plurality messages of the user to a category of a plurality of categories of electronic messages, the assigning comprising using the each message's features and the message classifier to assign the each message to one the message's corresponding category of the plurality of categories;
determining logic executed by the processor for determining, for a category of the plurality of categories, a composition style for the user, the determining comprising determining the user's composition style for the category using a number of messages, of the plurality of messages of the user, assigned to the category;
obtaining logic executed by the processor for obtaining, for the category of the plurality of categories, multiple non-personalized messages of multiple users;
generating logic executed by the processor for generating, for the user of an electronic messaging system, a number of personalized messages for the category of the plurality of categories, each personalized message being generated by modifying a non-personalized message, of the multiple non-personalized messages of the multiple users, using the user's determined composition style for the category; and
providing logic executed by the processor for providing, for the user of the electronic messaging system, the number of personalized messages generated using the user's composition style determined for the category of the plurality of categories, each personalized message, of the number, being selectable by the user for modification by the user.

11. The system of claim 10, the training logic further comprising:
collecting logic executed by the processor for collecting the corpus of messages comprising a number of messages in the each category of the plurality of categories;
identifying logic executed by the processor for identifying the features for the each message of the corpus; and
generating logic executed by the processor for generating the message classifier using the identified features of the each message of the corpus.

12. The system of claim 10, the assigning logic executed by the processor for assigning further comprising:
identifying logic executed by the processor for identifying the features for the each message of the user's plurality of messages; and
using logic executed by the processor for using, for the each message of the user's plurality of messages, the each message's features as input to the message classifier, the message classifier being used to provide a plurality of probabilities corresponding to the plurality of categories, each probability of the plurality corresponding to a category of the plurality and identifying a likelihood that the each message belongs to the category.

13. The system of claim 10, the determining logic executed by the processor for determining a plurality of composition styles of the user further comprising:
for the one category of the plurality of categories:
identifying logic executed by the processor for identifying a vocabulary of the user using the one category's assigned messages; and
identifying logic executed by the processor for identifying a syntactic function of each vocabulary element in the user's identified vocabulary.

14. The system of claim 10, each category's corresponding vocabulary comprising a plurality of elements and a number of element relationships, each element comprising one or more words.

15. The system of claim 14, the plurality of elements comprising a number of phrases.

16. The system of claim 10, the providing logic executed by the processor for providing further comprising:
for each non-personalized message:
replacing logic executed by the processor for replacing a number of non-personalized elements of the non-personalized message with personalized elements from the user's composition style for the category.

17. The system of claim 16, the replacing logic executed by the processor for replacing further comprising replacing logic executed by the processor for replacing a non-personalized greeting with a personalized greeting and a non-personalized signature with a personalized signature in accordance with the user's composition style for the category.

18. The system of claim 16, the replacing further comprising replacing a number of words used in the non-personalized message with words from the user's vocabulary identified for the category.

19. A computer readable non-transitory storage medium for tangibly storing thereon computer readable instructions that when executed cause an electronic messaging computing device to:
train a message classifier using a corpus of messages and machine learning;
retrieve, from a data store of a user, a plurality of messages of the user;
assign, using the message classifier, each message of a plurality of messages of the user to a category of a plurality of categories of electronic messages, the assigning comprising using the each message's features and the message classifier to assign the each message to one category of the plurality of categories;
determine, for a category of the plurality of categories, a composition style for the user, the determining comprising determining the user's composition style for the category using a number of messages, of the plurality of messages of the user, assigned to the category;

obtaining, for the category of the plurality of categories, multiple non-personalized messages of multiple users;

generating, for the user of an electronic messaging system, a number of personalized messages for the category of the plurality of categories, each personalized message being generated by modifying a non-personalized message, of the multiple non-personalized messages of the multiple users, using the user's determined composition style for the category; and provide, for the user of the electronic messaging system, the number of personalized messages generated using the user's composition style determined for the category of the plurality of categories, each personalized message, of the number, being selectable by the user for modification by the user.

20. The computer readable non-transitory storage medium of claim 19, the training the message classifier using machine learning further comprising:

collecting the corpus of messages comprising a number of messages in each category of the plurality;

identifying the features for the each message of the corpus; and generating the message classifier using the identified features of the each message of the corpus.

21. The computer readable non-transitory storage medium of claim 19, the computer readable instructions that when executed cause at least one processor to assign further comprising instructions that when executed cause the processor to:

identify the features for the each message of the user's plurality of messages; and use, for the each message of the user's plurality of messages, the each message's features as input to the message classifier, the message classifier being used to provide a plurality of probabilities corresponding to the plurality of categories, each probability of the plurality corresponding to a category of the plurality and identifying a likelihood that the each message belongs to the category.

22. The computer readable non-transitory storage medium of claim 19, the computer readable instructions that when executed cause at least one processor to determine a plurality of composition styles of the user further comprising instructions that when executed cause the processor:

for the one category of the plurality of categories:

identify a vocabulary of the user using the one category's assigned messages; and identify a syntactic function of each vocabulary element in the user's identified vocabulary.

23. The computer readable non-transitory storage medium of claim 19, each category's corresponding vocabulary comprising a plurality of elements and a number of element relationships, each element comprising one or more words.

24. The computer readable non-transitory storage medium of claim 23, the plurality of elements comprising a number of phrases.

25. The computer readable non-transitory storage medium of claim 19, the computer readable instructions that when executed cause at least one processor to provide further comprising instructions that when executed cause the processor to:

for each non-personalized message:

replace a number of non-personalized elements of the non-personalized message with personalized elements from the user's composition style for the category.

26. The computer readable non-transitory storage medium of claim 25, the computer readable instructions that when executed cause at least one processor to replace further comprising instructions that when executed cause the processor to replace a non-personalized greeting with a personalized greeting and a non-personalized signature with a personalized signature in accordance with the user's composition style for the category.

27. The computer readable non-transitory storage medium of claim 25, the computer readable instructions that when executed cause at least one processor to replace further comprising instructions that when executed cause the processor to replace a number of words used in the non-personalized message with words from the user's vocabulary identified for the category.

* * * * *